H. B. BABSON.
VALVE MOUNTING FOR MILKING MACHINES.
APPLICATION FILED JUNE 7, 1919.
1,333,460. Patented Mar. 9, 1920.
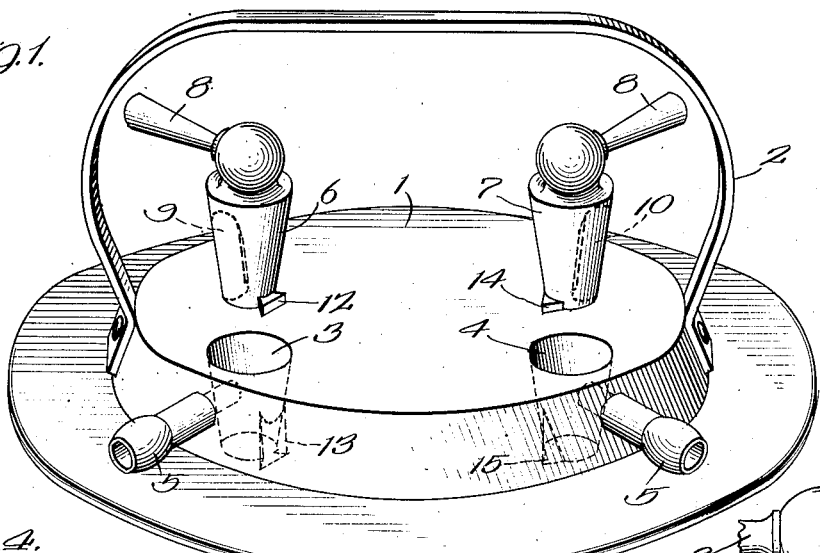
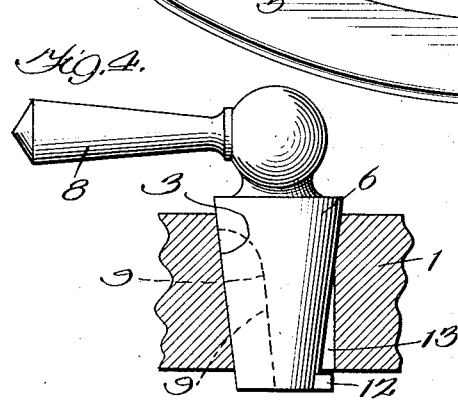
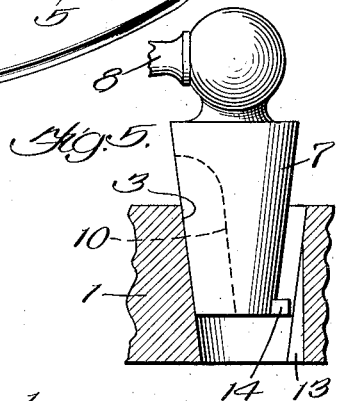
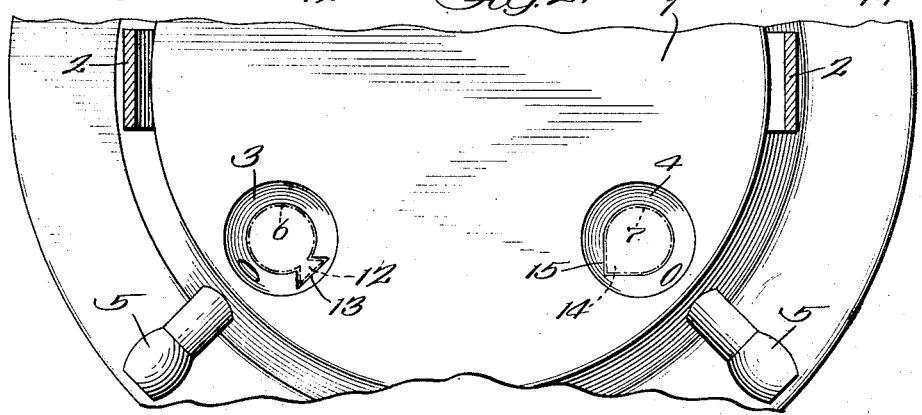
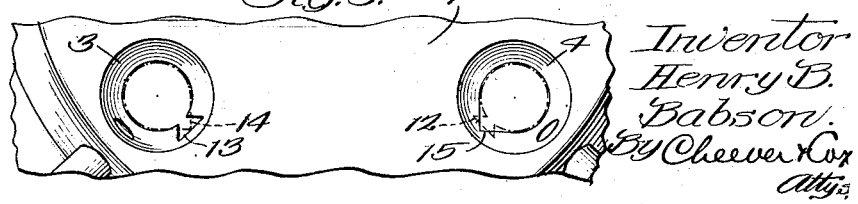

UNITED STATES PATENT OFFICE.

HENRY B. BABSON, OF CHICAGO, ILLINOIS, ASSIGNOR TO PINE TREE MILKING MACHINE COMPANY, OF CHICAGO, ILLINOIS, A CORPORATION OF ILLINOIS.

VALVE-MOUNTING FOR MILKING-MACHINES.

1,333,460.      Specification of Letters Patent.      Patented Mar. 9, 1920.

Application filed June 7, 1919. Serial No. 302,572.

*To all whom it may concern:*

Be it known that I, HENRY B. BABSON, a citizen of the United States, residing at Chicago, in the county of Cook and State of Illinois, have invented a certain new and useful Improvement in Valve-Mountings for Milking-Machines, of which the following is a specification.

My invention relates to milking machines of the type, for example, shown in Macartney Patent No. 1,266,697. In this type of machine the milk pail has a cover provided with two valves, designed to control the flow of milk and air from the different sets of teat cups to the inside of the pail. It is important that these valves fit accurately and for this reason it is the custom to grind them to fit their individual seats. The valves are usually of the same general size and shape and consequently present the same general appearance and hence are, of themselves, practically indistinguishable from each other. It has been the custom heretofore to indicate which valve belongs to a particular seat by placing suitable identifying marks upon the valves and their respective seats. These marks, however, are not always noticed or respected by the operator and hence the valves are apt to be wrongly assembled and thus operate in an unsatisfactory manner. The object of my invention is to provide means which will positively prevent the valves from being lowered into any but the proper seat. In a companion application filed by me on even date herewith I have shown a construction in which this object, broadly considered, is accomplished, but it will be evident from the following description and claims taken in connection with the accompanying drawings that the object is here accomplished by different means operating upon a different principle. Another object of my present invention is to provide means whereby, after a valve is seated, it cannot be accidentally lifted off its seat so long as it remains in open position. It will be understood that in this general type of milking machine the valve is open during the time that the machine is in active operation, which period is the one in which it is most important that the valve be not accidentally lifted from its seat.

I accomplish my objects by the mechanism illustrated in the accompanying drawings in which—

Figure 1 is a perspective view of the pail cover of a milking machine embodying my invention.

Fig. 2 is a plan view of the parts shown in Fig. 1, the valves being rotated to the position in which the respective interfitting parts are in register.

Fig. 3 is a more or less diagrammatic view, analogous to Fig. 2 but showing how the outlines of the patterns of the interfitting portions intersect each other if superposed and thus prevent a valve from being lowered onto the wrong seat.

Fig. 4 is a side elevation of a valve showing it fully lowered onto its seat and illustrating the fact that under these conditions the projection descends to a point below the bottom of the valve seat so as to engage the bottom of the pail cover and prevent the valve from being raised unless the projection is in register with the slot which it is designed to fit.

Fig. 5 is similar to Fig. 4 except that it shows the manner in which the projection prevents the valve from being lowered onto the wrong seat.

Like numerals denote like parts throughout the several views.

To describe the specific form selected to illustrate the principle of the invention:

The pail cover 1 has a handle 2, and two valve seats 3, 4 which are conically tapered and extend from top to bottom of the cover. Leading to the side of each valve seat is a nipple 5 which in practice leads to the teat cup, to put the same under vacuum and to convey the milk from the teat cup to the inside of the pail. The valve seat 3 is adapted to receive the conically tapered valve 6, while the valve seat 4 is adapted to receive the similarly shaped valve 7. These valves are provided with hand levers 8 in the usual manner. Each valve has a passage 9 in the side which, when the valve is open, leads from the inner mouth of the nipple 5 to the inside of the pail beneath the pail cover. The valves and their handles and the valve seats are in the main of substantially the same size and shape except that the valves are accurately fitted to their respective seats so as to hold the vacuum, but according to my invention, for the purpose of preventing interchange of the valves, interlocking parts are provided.

In the specific form shown, valve 6 has a dove tail projection 12 extending laterally from the lower end and adapted to slide into corresponding slot 13 in valve seat 3. On account of the taper of the valve it is not necessary for the slot 13 to extend up more than part way to the top of the valve seat. Hence the upper end of the valve seat and of the valve may be whole and leakage prevented. It will be noted by reference to Fig. 4 that the valve is long enough and the projection 12 so placed that when the valve is seated, the projection comes below the bottom of the cover and hence when the valve is rotated, and the projection is out of register with the slot, the projection will prevent the valve from being raised. It is desirable that the parts be so relatively positioned that when the valve is open—that is, when passage 9 is in register with nipple 5, the projection 12 will be out of register with the slot 13, and hence the valve will be locked to its seat.

The valve 7 has a projection 14 at the bottom adapted to slide in the slot 15 at the bottom of the valve seat 4. This projection, instead of being dove tail, with the narrowest portion at the valve, and the widest portion remote from the valve, is reversed and its widest portion is at the valve while its narrowest portion is remote therefrom. The dimensions are such that the widest portion of the part 14 is wider than the narrow base portion of the projection 12, and conversely, the widest portion of the projection 12 is wider than the narrower portion of the projection 14. In other words, the outlines of the patterns would overlap if they were superposed—a fact illustrated by Fig. 3. The projection 14 cannot be lowered into the slot 13 because it is too wide at the base, and the projection 12 cannot be lowered into the slot 15 because it is too wide at the outer end. Consequently, neither projection can be lowered into the slot of the wrong valve seat.

The projection 14, like the projection 12, descends far enough when the valve is seated to lock the valve seated when the latter is in open position.

It will be understood that the patterns are not necessarily confined to a dove tail and a wedge. The patterns may be modified without causing the parts to lose their function. It will be evident that the purpose will be subserved by selecting such patterns that when superposed, the outlines of one will intersect the outlines of the other.

Attention is called to my copending application filed June 9, 1919, Serial No. 302,701.

Having thus described my invention what I claim as new and desire to secure by Letters Patent, is:

1. In a milking machine, a milk pail cover having a plurality of valve seats and a valve for each seat, one valve and its seat having interfitting portions of definite pattern at the periphery adapted to permit the valve to be lowered onto its seat when rotated to the position in which the interfitting parts register, and the second valve and its seat having interfitting portions of definite pattern at the periphery adapted to permit the second valve to be lowered onto its seat when rotated to the position in which the interfitting parts register, the pattern of one valve and seat being adapted to overlap the pattern of the other valve and seat if said patterns were superposed, whereby the valves are non-interchangeable in their seats.

2. In a milking machine, a milk pail cover having a plurality of valve seats and a valve for each seat, the valves and seats being conically tapered, one valve and its seat having interfitting portions of definite pattern at the portion of smaller diameter, adapted to permit the valve to be lowered onto its seat when rotated to the position in which the interfitting parts register, and the second valve and its seat also having interfitting portions of definite pattern at the portion of smaller diameter, adapted to permit the valve to be lowered onto its seat when rotated to the position in which the interfitting parts register, the pattern of one valve and seat having an outline such as to cross the outline of the pattern of the other valve and seat.

3. In a milking machine, a milk pail cover having a plurality of conically tapered valve seats and a valve for each seat, one valve and its seat having interfitting portions of definite pattern at the portion of smaller diameter, the interfitting portions extending only part way along the valve lengthwise thereof, whereby the portion of larger diameter is whole, the second valve and its seat also having interfitting portions of a different pattern at the portion of smaller diameter, the interfitting portions extending only part way along the valve lengthwise thereof, whereby the portion of large diameter is whole, the outlines of the two patterns being such as to intersect, if superposed, to thereby prevent the valves from being lowered into the wrong seats.

4. In a milking machine, a milk pail cover having a plurality of valve seats, and a rotatable valve for each seat, the valves having radial projections on the side, said projections being of such different patterns that if superposed, the outlines would intersect, the valve seats having slots in which the radial projections are adapted to slidingly fit, the cover having shoulders and the projections on the valve descending to a point beyond the shoulders when the valves are seated, whereby the valves cannot be lifted out of their seats except when rotated to the position in which said projection will register with said slots, and the valves can at no time be lowered into the wrong seats.

5. In a milking machine a milk pail cover having a plurality of conically tapered valve seats, a rotatable valve fitting each seat, the valves having radial projections at the side of such different patterns that if superposed their outlines would project, said projections being formed at the smaller end of the valve and adapted to engage a shoulder on the valve seat when the valves are seated, the valve seats having slots extending parallel to the axis of the valve, said projections being adapted to fit slidingly within the slots in their respective valve seats.

6. In a milking machine a milk pail cover having a plurality of conically tapered valve seats, a rotatable valve fitting each seat, the valves having radial projections at the side of such different patterns that if superposed their outlines would project, said projections being formed at the smaller end of the valve and adapted to engage a shoulder on the valve seat when the valves are seated, the valve seats having slots extending parallel to the axis of the valve (for a portion of the length of the valve seat) said projections being adapted to fit slidingly within the slots in their respective valve seats.

7. In a milking machine, a milk pail cover having a plurality of conically tapered valve seats, each having a port in the side, a rotatable valve fitting each seat and having a passage in the side adapted to lead from the port to the underside of the pail cover when the valve is open, the first valve and its seat having interfitting portions of definite pattern adapted to permit the valve to be lowered onto its seat when rotated to a position to bring the interfitting parts in register, the interfitting portions consisting one of a projection and the other of a slot, the said passage in said first valve being out of register with its port when said interfitting parts are in register, the second valve being similarly constructed except that the pattern of the interfitting portions is different and the outline of the second would intersect the outline of the first mentioned pattern if the two were superposed, thereby preventing the valves from being lowered into the wrong seats.

8. In a milking machine, a milk pail cover having a plurality of conically tapered valve seats, each having a port in the side, a rotatable valve fitting each seat and having a passage in the side adapted to lead from the port to the underside of the pail cover when the valve is open, the first valve and its seat having interfitting portions of definite pattern adapted to permit the valve to be lowered onto its seat when rotated to a position to bring the interfitting parts in register, the interfitting portions consisting one of a projection and the other of a slot, the projecting portion lying beyond the end of the slot when the valve is seated, and being thereby adapted to prevent the lifting of the valve from its seat except when the projection and its slot are in register, the said passage in said first valve being out of register with its port when said interfitting parts are in register, the second valve being similarly constructed except that the pattern of the interfitting portions is different and the outline of the second would intersect the outline of the first mentioned pattern if the two were superposed, thereby preventing the valves from being lowered into the wrong seats.

In witness whereof I have hereunto subscribed my name.

HENRY B. BABSON.